United States Patent
Tokie (10) Patent No.: US 8,850,039 B2
(45) Date of Patent: Sep. 30, 2014

(54) INFORMATION PROCESSING SYSTEM, INFORMATION PROCESSOR, INFORMATION PROCESSING METHOD, RECORDING MEDIUM, AND COMPUTER DATA SIGNAL

(75) Inventor: Katsuji Tokie, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 776 days.

(21) Appl. No.: 11/689,566

(22) Filed: Mar. 22, 2007

(65) Prior Publication Data

US 2008/0046413 A1  Feb. 21, 2008

(30) Foreign Application Priority Data

Aug. 17, 2006  (JP) .................................. 2006-222521

(51) Int. Cl.
G06F 17/30 (2006.01)

(52) U.S. Cl.
CPC .... G06F 17/30864 (2013.01); G06F 17/30876 (2013.01)
USPC .......................................... 709/229; 709/217

(58) Field of Classification Search
CPC ..................... G06F 17/30864; G06F 17/30876
USPC ......... 709/217–219, 224, 226, 229, 238–244; 707/3, 204
See application file for complete search history.

(56) References Cited

U.S. PATENT DOCUMENTS

| | | | |
|---|---|---|---|
| 6,266,772 B1 | 7/2001 | Suzuki | |
| 7,143,144 B2 | 11/2006 | Kanai et al. | |
| 7,254,571 B2* | 8/2007 | Brown et al. | 707/3 |
| 7,272,641 B2* | 9/2007 | Yamagishi | 709/218 |
| 7,318,061 B2* | 1/2008 | Rothschild | 1/1 |
| 7,346,655 B2* | 3/2008 | Donoho et al. | 709/204 |
| 7,797,241 B2* | 9/2010 | Colson et al. | 705/52 |
| 2001/0010050 A1 | 7/2001 | Sakata | |
| 2002/0072997 A1 | 6/2002 | Colson et al. | |

(Continued)

FOREIGN PATENT DOCUMENTS

| | | |
|---|---|---|
| GB | 2405227 | 2/2005 |
| JP | 11039395 A | 2/1999 |

(Continued)

OTHER PUBLICATIONS

Office Action issued on Sep. 25, 2008 from the Australian Patent Office for corresponding Australian Patent Application No. 2007201620.

(Continued)

Primary Examiner — Kenneth Coulter
(74) Attorney, Agent, or Firm — Gesmer Updegrove LLP (57) ABSTRACT

This system has a unit that specifies storage location of electronic information of which publication is to be validated; a unit that acquires the publicized electronic information to be validated from the specified storage location; a unit that registers, in a memory, publication validation information of the acquired publicized electronic information, which includes at least one of image data of the publicized electronic information and acquisition record information which indicates a path by which the publicized electronic information is acquired; a unit that designates a search condition to search electronic information of which publication is to be verified; a unit that searches the memory according to the designated search condition, to specify publicized electronic information; a unit that reads, from the memory, publication validation information of the specified publicized electronic information and transmits the reading information; and a unit that verifies the transmitted reading information.

16 Claims, 9 Drawing Sheets

(56) References Cited

U.S. PATENT DOCUMENTS

| | | | | |
|---|---|---|---|---|
| 2003/0009534 A1* | 1/2003 | Yamagishi | ............... | 709/217 |
| 2004/0230843 A1* | 11/2004 | Jansen | ............... | 713/202 |
| 2005/0044369 A1* | 2/2005 | Anantharaman | ............ | 713/176 |
| 2005/0188053 A1 | 8/2005 | Shimamura et al. | | |
| 2006/0036611 A1* | 2/2006 | Rothschild | ............... | 707/10 |
| 2008/0201552 A1* | 8/2008 | Tokie | ............... | 711/204 |

FOREIGN PATENT DOCUMENTS

| | | | |
|---|---|---|---|
| JP | 2001154988 | | 6/2001 |
| JP | 2001154989 | | 6/2001 |
| JP | 2003087306 | A | 3/2003 |
| JP | 2004234304 | A | 8/2004 |
| JP | 2005157632 | | 6/2005 |
| JP | 2007060336 | A | 3/2007 |

OTHER PUBLICATIONS

Internet Archive Frequently Asked Questions retrieved from <http://www.archive.org/about/faqs.php> published 1996.

JP Notice of Grounds for Rejection mailed on Nov. 8, 2011 in connection with corresponding JP Application No. 2006-222521 and English translation thereof.

Fukagawa, "Manners of Organization, Technique of Retrieval, and Macintosh as Information Management Tool", MAC Power, vol. 14, No. 1, Japan, ASCII Corporation, 2003, pp. 254-255.

Notice of Grounds for Rejection mailed on Aug. 2, 2011, in connection with corresponding JP Patent Application No. 2006-222521 and English translation thereof.

Australian Office Action issued on Aug. 4, 2009, for corresponding Australian Application No. AU 2007201620.

Internet Archive Frequently Asked Questions (retrieved on Jul. 30, 2009) published on Aug. 14, 2006 as per Wayback Engine.

* cited by examiner

SEARCH RESULT DISPLAY SCREEN

| DOCUMENT NAME | BASE SITE NAME | LINK DEPTH | PRESENCE DATE AND TIME |
|---|---|---|---|
| SUMMARY OF PRODUCT XX | siteA.co.jp | 5 | 2003/11/1 10:05:32 |
| YY NEWS | siteB.com | 3 | 2001/3/3 16:30:14 |
| REVIEW OF ZZ | siteC.co.jp | 5 | 2002/3/3 11:23:03 |
| CHARACTERISTIC OF XX | siteA.co.jp | 6 | 2003/11/1 10:05:32 |
| REPORT OF XX | siteB.com | 3 | 2001/3/10 18:12:23 |

98 RESULTS   RESULTS 1 - 5   NEXT

Fig. 8

Fig. 9 ized information acquiring unit that acquires the publicized electronic information to be validated from the specified storage location; an information registering unit that registers, in a memory, publication validation information of the acquired publicized electronic information, the publication validation information includes at least one of image data of the publicized electronic information and acquisition record information which indicates a path by which the publicized electronic information is acquired; a searching unit that designates a search condition to search electronic information of which publication is to be verified; an information specifying unit that searches the memory according to the designated search condition, to specify publicized electronic information which matches the search condition; an information transmitting unit that reads, from the memory, publication validation information of the specified publicized electronic information and transmits the publication validation information; and a verification unit that verifies the transmitted publication validation information.

INFORMATION PROCESSING SYSTEM, INFORMATION PROCESSOR, INFORMATION PROCESSING METHOD, RECORDING MEDIUM, AND COMPUTER DATA SIGNAL

CROSS-REFERENCE TO RELATED APPLICATIONS

This application is based on and claims priority under 35 USC 119 from Japanese Patent Application No. 2006-222521, filed on Aug. 17, 2006.

BACKGROUND

1. Technical Field

The present invention relates to an information processing system, an information processor, an information processing method, a recording medium storing a program, and computer data signal.

2. Related Art

Electronic information publicized on the Internet is generally assumed to be known to the public. If electronic information is still publicized at the current time, it is possible to access the publicized information to easily validate that the publicized information is known to the public.

In related art, when a person wishes to validate that electronic information has been publicized, in general, the person employed a method in which the electronic information was publicized on the Internet, and at the same time, published on a gazette by a paper medium, so that the information was made known to the public.

In general, in order for electronic information to be "known to public", the electronic information must be present on the Internet in a state in which the electronic information can be referred to by any one. Therefore, a person publicizing the electronic information must improve convenience of the referring process by a third party by, for example, creating the electronic information using general-purpose software, and storing the electronic information in a location which can be easily found by the third party. In other words, from the viewpoint of the person publicizing the electronic information, it is desirable that it can be validated that the person has publicized the electronic information in consideration of making the electronic information known to the public.

SUMMARY

According to an aspect of the present invention, there is provided an information processing system having an information specifying unit that specifies storage location of electronic information of which publication is to be validated; a publicized information acquiring unit that acquires the publicized electronic information to be validated from the specified storage location; an information registering unit that registers, in a memory, publication validation information of the acquired publicized electronic information, the publication validation information includes at least one of image data of the publicized electronic information and acquisition record information which indicates a path by which the publicized electronic information is acquired; a searching unit that designates a search condition to search electronic information of which publication is to be verified; an information specifying unit that searches the memory according to the designated search condition, to specify publicized electronic information which matches the search condition; an information transmitting unit that reads, from the memory, publication validation information of the specified publicized electronic information and transmits the publication validation information; and a verification unit that verifies the transmitted publication validation information.

BRIEF DESCRIPTION OF THE DRAWINGS

Exemplary embodiment(s) of the present invention will be described in detail based on the following figures, wherein.

DETAILED DESCRIPTION

An exemplary embodiment of the present invention will now be described by reference to the drawings.

Figure 1:
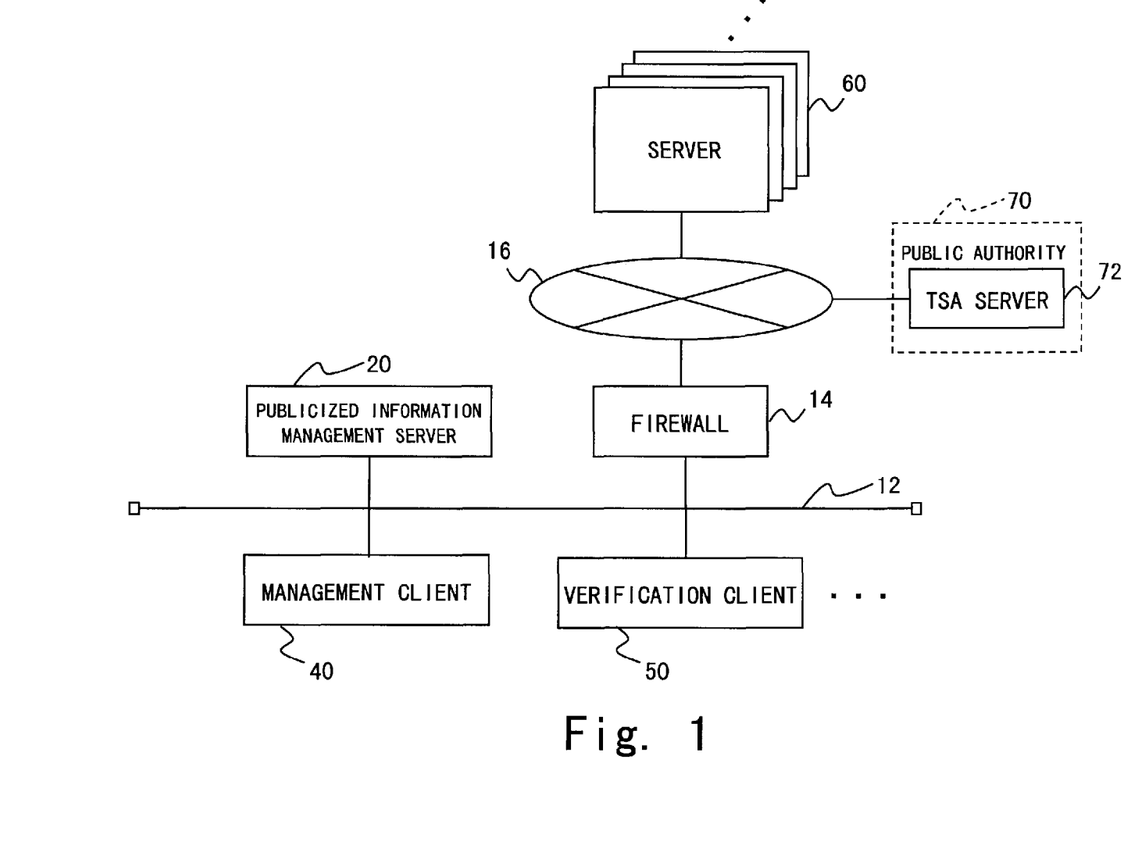
FIG. 1 is an overall structural diagram showing an exemplary embodiment of an information processing system according to an aspect of the present invention.

FIG. 1 is an overall structural diagram showing an exemplary embodiment of an information processing system according to the present invention. FIG. 1 shows a publicized information management server 20, a management client 40, a verification client 50, and a firewall 14 which are connected to a network 12 such as a LAN (Local Area Network), the Internet 16, a server 60, and a server (TSA server) 72 owned by a time stamp authority which is a public authority 70.

The publicized information management server 20 is a server computer which collects, in order to validate that electronic information which is publicized on a server 60 or which has been publicized on the server 60 for a certain period of time (hereinafter referred to as "publicized information") has actually been publicized, information related to the publicized information during the period when the publicized information is being publicized, creates publication validation information, and stores and manages the publication validation information.

The management client 40 is a client computer to be used for setting publicized information, for which publication is to be validated, by specifying a storage location of publicized information. Normally, one management client 40 is sufficient, but the number of the management clients 40 is not limited to 1.

The verification client 50 is a client computer to be used for sending an inquiry designating a search condition to the publicized information management server 20 and verifying whether or not all or a portion of publicized information which matches the search condition has been publicized. Typically, multiple verification clients 50 are provided in order to allow verification by multiple users, but the number of verification clients 50 is not limited, and may be 1.

The server 60 is a server computer on which the electronic information is publicized. Among the electronic information publicized by each server 60, the electronic information publicized by the server 60 specified by the management client 40 corresponds to the publicized information for which publication is to be validated. More specifically, electronic information located at a location from the homepage of the server 60 specified by the storage location specifying information to a location at a depth of a link, which is set when the storage location is designated, from the homepage of the server 60 are selected as the electronic, information for which publication is to be validated. The details of this process will be described later.

The TSA server 72 included in the public authority 70 is a server computer which attaches a time stamp in response to a request from the publicized information management server 20.

Figure 2:
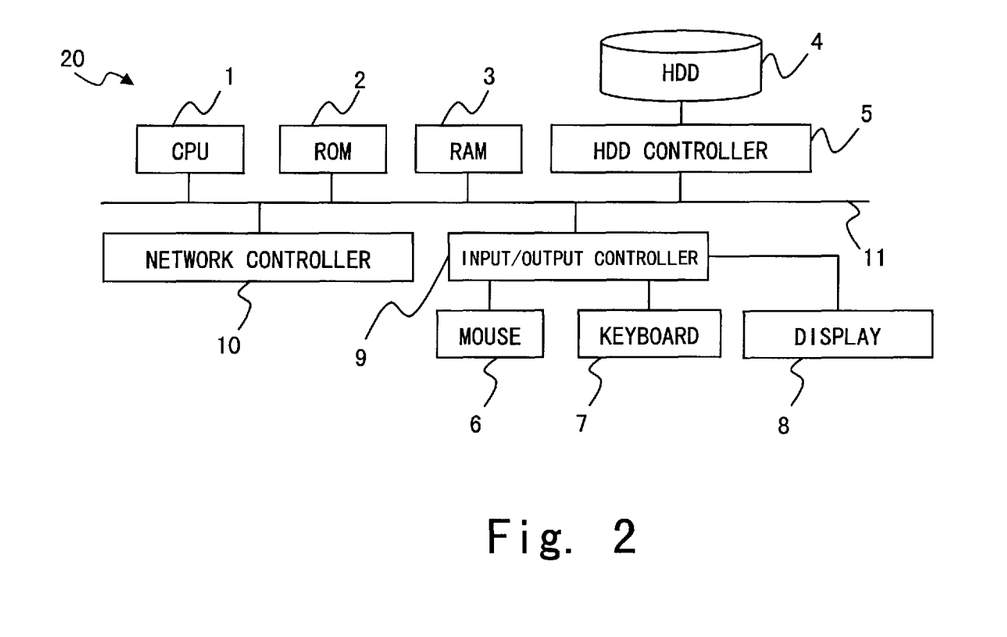
FIG. 2 is a hardware structure diagram showing a server computer which realizes a publicized information management server 20 in an exemplary embodiment according to the present invention.

FIG. 2 is a hardware structure diagram showing a server computer which realizes the publicized information management server 20 in the exemplary embodiment according to the present invention. The publicized information management server 20 used in the exemplary embodiment of the present invention can be realized using a general-purpose hardware structure which is available in related art. Specifically, as shown in FIG. 2, the publicized information management server 20 has a CPU 1, a ROM 2, a RAM 3, and an HDD controller 5 to which a hard disk drive (HDD) 4 is connected. In addition, the publicized information management server 20 has an input/output controller 9 to which a mouse 6 and a keyboard 7 which are provided as inputting devices and a display 8 which is provided as a display device are connected, and a network controller 10 provided as a communication unit, the input/output controller 9 and the network controller 10 being connected to an internal bus 11.

In the exemplary embodiment, the clients 40 and 50 are considered to be realized by personal computers, and thus the hardware structure for the clients 40 and 50 can be constructed similar to that shown in FIG. 2, although the performance may be different from the publicized information management server 20.

Figure 3:
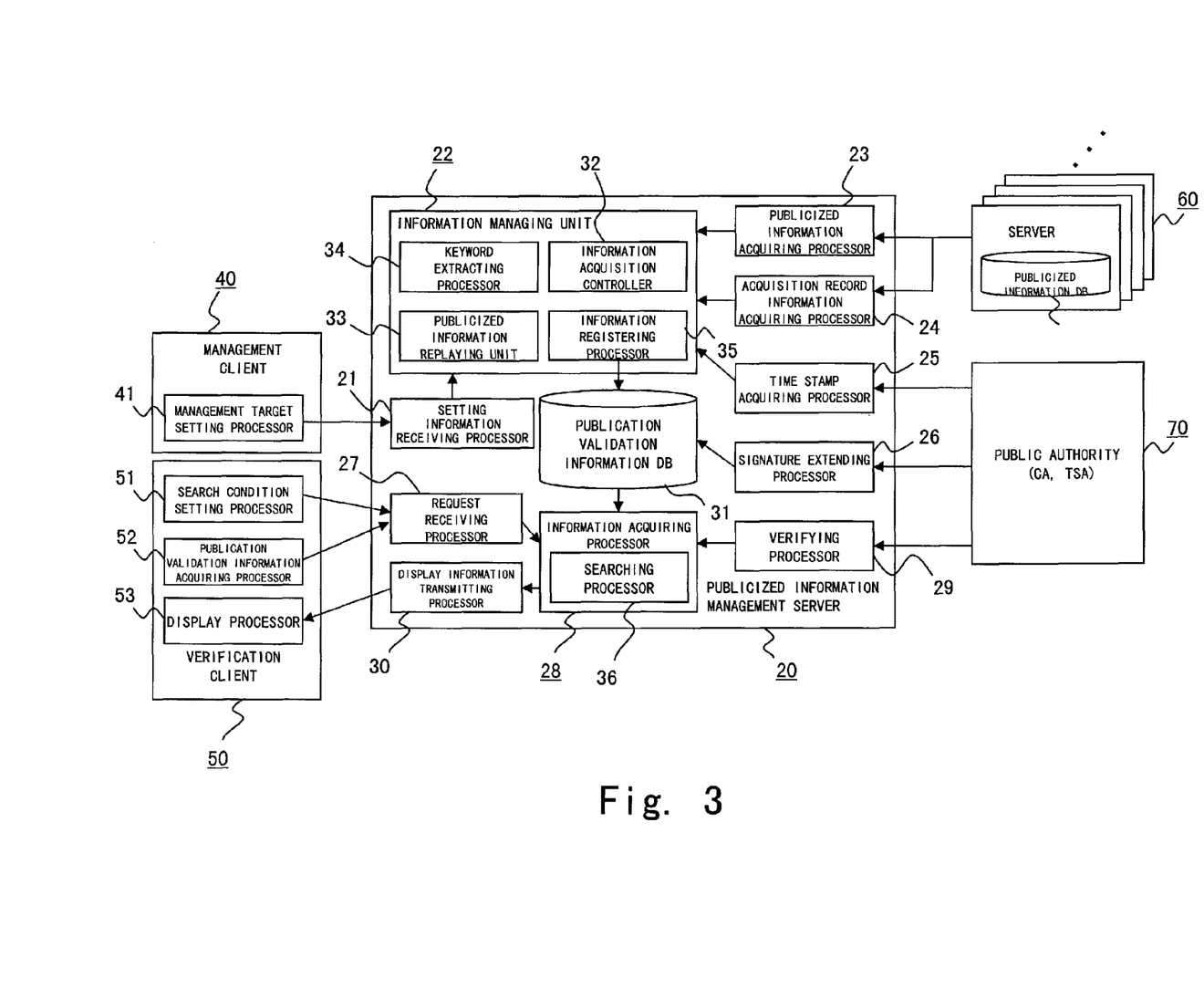
FIG. 3 is a block structural diagram of an information processing system of an exemplary embodiment according to the present invention.

FIG. 3 is a block structural diagram of an information processing system in the exemplary embodiment according to an aspect of the present invention. The publicized information management server 20 has a setting information receiving processor 21, an information managing unit 22, a publicized information acquiring processor 23, an acquisition record information acquiring processor 24, a time stamp acquiring processor 25, a signature extending processor 26, a request receiving processor 27, an information acquiring processor 28, a verifying processor 29, and a display information transmitting processor 30.

The setting information receiving processor 21 receives information for specifying a storage location of electronic information for which publication is to be validated. The system may be configured such that the information is input through the user interface of the publicized information management server 20, but in the exemplary embodiment, the system is configured such that information transmitted from the management client 40 is received.

The publicized information acquiring processor 23 acquires publicized information from the server 60 which can be specified by the storage location specifying information received by the setting information receiving processor 21. The acquisition record information acquiring processor 24 acquires acquisition record information including at least an acquiring route when the publicized information acquiring processor 23 acquires the publicized information from the server 60. The time stamp acquiring processor 25 acquires, as presence validation information, a time stamp for display image data or the acquisition record information of publicized information from a time stamp authority according to an instruction from the information managing unit 22. The signature extending processor 26 executes an extension process of expiration date in order to avoid termination of the valid period of the time stamp acquired for the display image data or the acquisition record information of the publicized information.

The information managing unit 22 collectively manages information related to the electronic information received by the setting information receiving processor 21. The information managing unit 22 in the exemplary embodiment has an information acquisition controller 32, a publicized information replaying unit 33, a keyword extracting processor 34, and an information registering processor 35. The information acquisition controller 32 controls an acquisition process of information such as, for example, instructing various information acquisition processes by the publicized information acquiring processor 23 and the acquisition record information acquiring processor 24. The publicized information replaying unit 33 creates display image data to be displayed on a screen by replaying the publicized information acquired by the publicized information acquiring processor 23. The keyword extracting processor 34 automatically extracts a keyword for allowing searching of the publicized information as verification target during the verification process by analyzing the acquired publicized information or publication record information. The information registering processor 35 registers, in a publication validation information database 31, publicized information converted to display image data, the acquisition record information, the time stamp for validating time of presence of each information, keyword, etc., as publication validation information.

The request receiving processor 27 receives the search condition, an acquisition request of the publication validation information, etc. transmitted from the verification client 50. The information acquiring processor 28 extracts the requested information from the publication validation information database 31. A searching processor 36 included in the information acquiring processor 28 executes a search process according to the received search condition, to specify the corresponding publicized information. The verifying processor 29 verifies information displayed on the verification client 50 according to an instruction from the verification client 50. The display information transmitting processor 30 transmits information to be displayed on the verification client 50.

The constituting elements 21-30 in the publicized information management server 20 are realized by cooperation between a computer forming the publicized information management server 20 and a program operating on the CPU equipped in the computer. The publication validation information database 31 is realized by an external storage device equipped on the publicized information management server 20.

The management client 40 has a validation target setting processor 41 which specifies electronic information for which publication is to be validated. The validation target setting processor 41 is realized by cooperation of a computer forming the management client 40 and a program running on the CPU equipped in the computer.

The verification client 50 has a search condition setting processor 51, a publication validation information acquiring processor 52, and a display processor 53. The search condition setting processor 51 sets, through a predetermined screen, a search condition for specifying publicized information to be verified and transmits the search condition to the publicized information management server 20. Information related to one or multiple publicized information matching the transmitted search condition are transmitted from the publicized information management server 20 and are displayed on the screen. The publication validation information acquiring processor 52 transmits, to the publicized information management server 20, an acquisition request for publication validation information of publicized information selected from the list by the user. The display processor 53 executes the display process for the display of screens such as, for example, a search condition setting screen and a display screen of a search result according to the search condition. The constituting elements 51-53 in the verification client 50 are realized through cooperation of a computer forming the verification client 50 and a program running on a CPU equipped in the computer. The programs used in the exemplary embodiment may be provided by a communication unit or in the form of programs stored in a computer-readable recording medium such as a CD-ROM and a DVD-ROM. The program provided by a communication unit or from a recording medium is installed in the computer and the CPU of the computer sequentially executes the installed program to realize various processes.

An operation in the exemplary embodiment will now be explained. The operation in the exemplary embodiment can be broadly divided into a process to collect information related to publicized information for which publication now or in the past is to be validated, and a process to verify that the publicized information is being publicized or was publicized. A process to specify publicized information to be validated and to collect information related to the publicized information, that is, publication validation information for validating that the publicized information is being publicized or was publicized, will first be described referring to a flowchart of FIG. 4.

Figure 4:
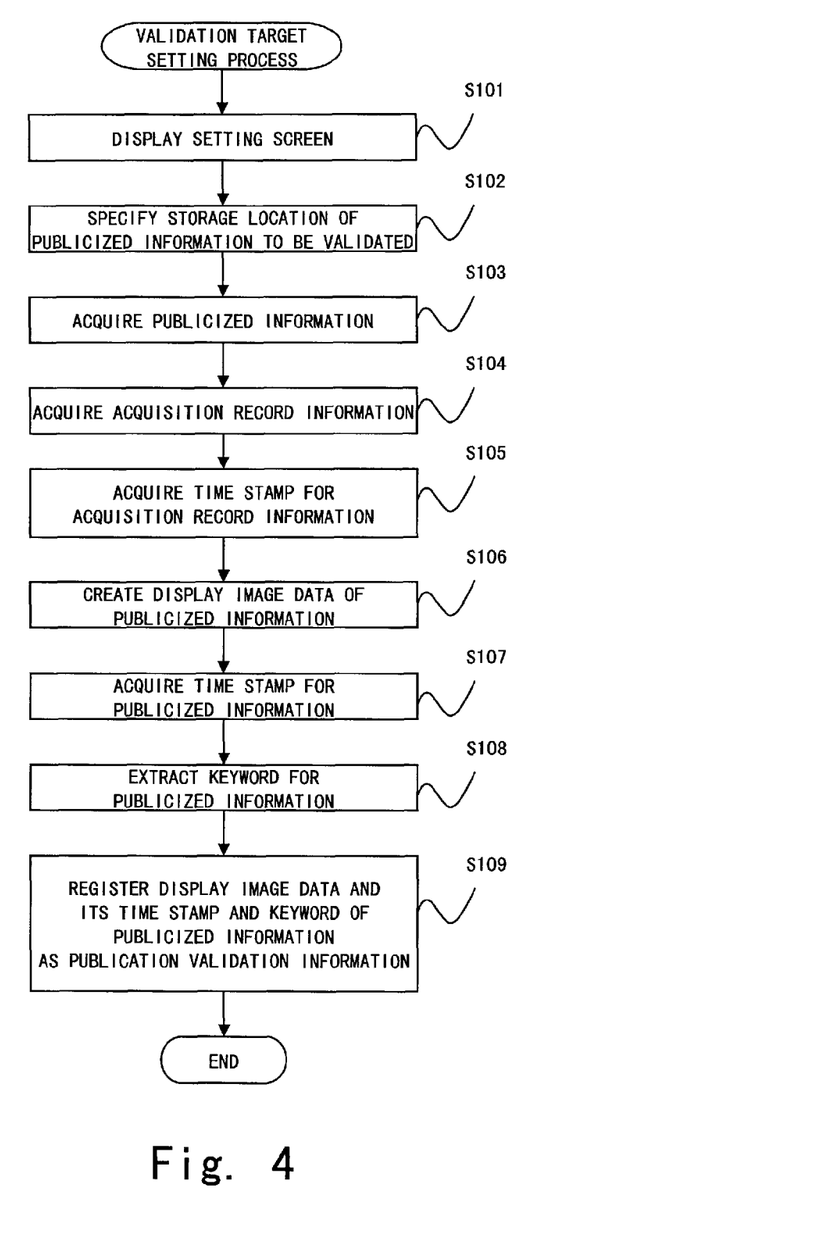
FIG. 4 is a flowchart showing a process for setting publicized information for which publication is to be validated, and for collecting and registering information related to the publicized information.
Figure 5:
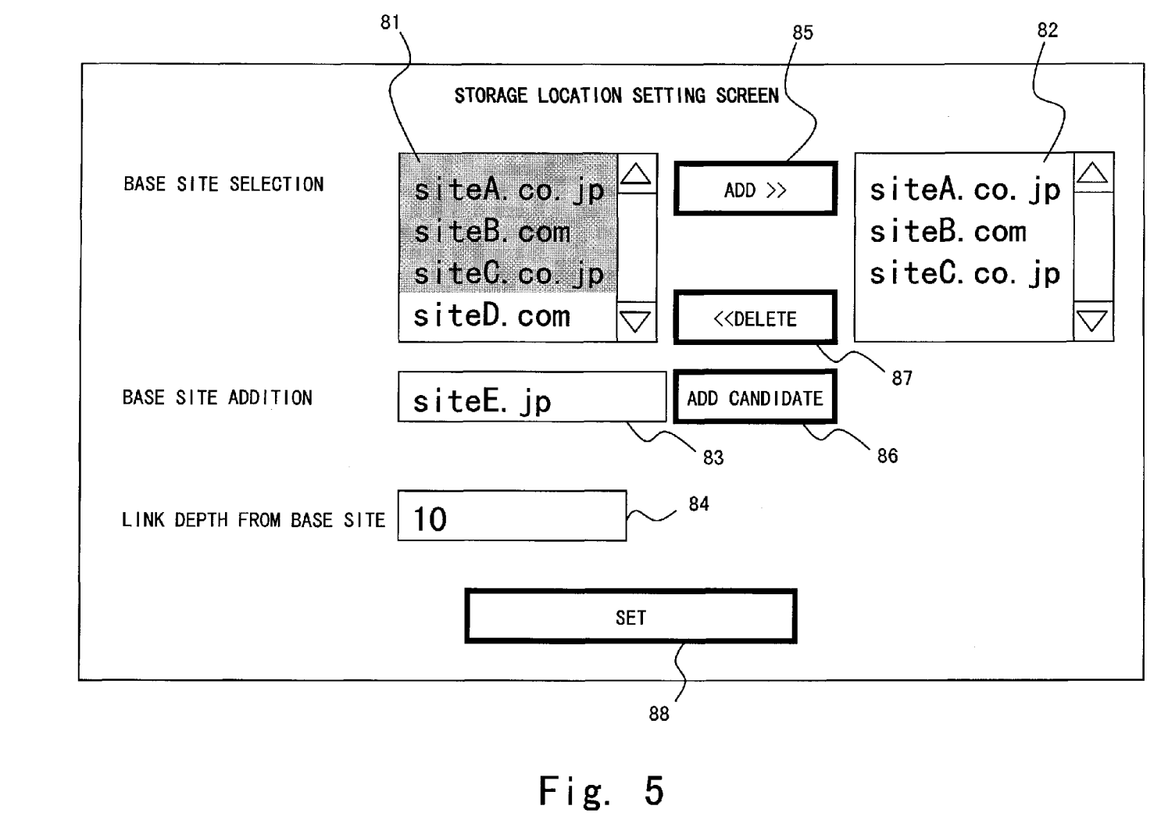
FIG. 5 is a diagram showing an example of a storage location setting screen in an exemplary embodiment according to the present invention.

First, at the management client 40, the validation target setting processor 41 displays, on the display of the management client 40, a screen for setting a location of collection of publicized information in response to an input operation by a user such as the system administrator (step 101). FIG. 5 shows an example display of a setting screen which is displayed on the screen. The validation target setting processor 41 may be configured to display the setting screen by starting an application which is provided in the management client 40 in advance or may be configured to display the screen by extracting a file described in HTML (HyperText Markup Language) from the publicized information management server 20 using a browser function which is provided in the validation target setting processor 41. In the latter case, the management client 40 does not need special software for realizing the exemplary embodiment.

In the setting screen of FIG. 5, a candidate site display region 81, a selected site display region 82, an additional site input region 83, and a depth input region 84 in which a depth of link is designated, are provided. In the exemplary embodiment, URLs (Uniform Resource Locator) of prominent sites storing publicized information to be set as the validation target are registered in a predetermined storage unit in advance, and a list of URLs is displayed in the candidate site display region 81 as selection candidates. Thus, the user selects a URL of a site storing the publicized information to be validated by clicking the URL of the site from among the URLs displayed in the candidate site display region 81 in a list, and clicks on an ADD button 86. In this manner, the selected URL is displayed on the selected site display region 82, and the user can visually confirm that the URL has been specified as a storage location of the publicized information to be validated. However, because there may be cases in which the URL desired by the user is not registered as a selection candidate in advance, in the exemplary embodiment, a desired URL can be manually set and input from the additional site input region 83. More specifically, the user clicks on an ADD CANDIDATE button 86 after inputting a desired URL in the additional site input region 83. In this manner, the input URL is displayed on the selected site display region 82, and the user can visually confirm that the input URL is specified as the storage location of the publicized information to be validated. Alternatively, the system may also be configured such that the URL input in the additional site input region 83 is registered as a URL to be displayed in the candidate site display region 81 in the future. In addition, by clicking on a DELETE button 87 after selecting the URL displayed on the selected site display region 82, the user can remove the site corresponding to the selected URL from the sites storing the publicized information to be validated.

As described, after the validation target setting processor 41 displays a setting screen on the display of the management client 40, the validation target setting processor 41 displays, in the candidate site display region 81, the URLs of the selection candidate sites which are registered in advance, and displays the URL selected by the user in the selected site display region 82 in response to clicking of the ADD button 85. In addition, when the ADD CANDIDATE button 86 is clicked, the URL input in the additional site input region 83 is displayed on the selected site display region 82. The URL selected by the user in the selected site display region 82 is deleted from the selected site display region 82 in response to clicking of the DELETE button 87.

The server 60 corresponding to the site may not store all publicized information in the storage location indicated by the URL. In other words, a hierarchical structure from the base folder indicated by the URL may be formed in the server 60 and the publicized information may be stored in a folder located in any of the hierarchical level. Therefore, it is not appropriate to set only the storage location indicated by the URL as the storage location of the publicized information. On the other hand, if it is to be attempted to collect the publicized information from a hierarchical level which is too deep, the amount of information may become enormous. In addition, regarding publicized information at a deep hierarchical level, the administrator of the server 60 (information publicizing user) may not intend to publicize the electronic information. Thus, it may not be necessary to include such publicized information as a validation target. In consideration of this, in the exemplary embodiment, not all of the electronic information present in the site selected by the user is set as the validation target, but rather, the validation target is limited to a predetermined hierarchical depth, that is, the depth of the link from the base site indicated by the URL. The user of the management client 40 thus inputs and designates, in the depth input region 84, a depth of link for which the publicized information is to be acquired as necessary. When no depth is designated, the depth is set as 1, which is the initial value. That is, only the publicized information stored in the storage location indicated by the URL are set as the validation target.

When the user inputs and designates necessary setting items and clicks on a "SET" button 88, the validation target setting processor 41 transmits, to the publicized information management server 20, a site displayed in the selected site display region 82 as storage location specifying information and the set depth of link as a validation target limiting condition. In this manner, the management client 40 specifies publicized information to be validated (step 102).

In the exemplary embodiment, the system is configured so that the depth of the link is set common to all selected sites, but the present invention is not limited to such a configuration, and the system may alternatively be configured to allow setting of link depth individually for each site. In addition, in the exemplary embodiment, the system is configured so that all publicized information included in the set storage location are set as the validation target, but the present invention is not limited to such a configuration, and the system may alternatively be configured to allow setting of the publicized information to be validated not in units of the storage location, but in finer units such as, for example, in units of providing users of the publicized information, in units of file names, and so on.

In the exemplary embodiment, the ease to access the publicized information is considered as an indicator of degree of publication. In other words, because information at a shallower link depth from the base site is more easily accessed from the outside, the degree of publication is considered to be higher. That is, the publicizing user intends to publicize such information. Thus, the degree of publication of electronic information stored at a location of a deeper link depth is relatively low, and in the exemplary embodiment, the link depth from the base site can be set as a validation target limiting condition for limiting the publicized information to be validated. Alternatively, it is also possible to form the setting screen to allow input and designation of an indicator other than the link depth and provide the set indicator to the publicized information management server 20 as a validation target limiting condition.

At the publicized information management server 20, when the setting information receiving processor 21 receives information transmitted from the management client 40, the information managing unit 22 stores, in an internal storage unit or a predetermined storage unit, the URL included in the received information, that is, the information for specifying the storage location which is set as the validation target, and a link depth of the publicized information. In a periodical process as will be described later, the publicized information collection location is specified by the stored information. The information acquisition controller 32 in the information managing unit 22 instructs the publicized information acquiring processor 23 to acquire publicized information from a server 60 which can be specified by the URL included in the received information, and the publicized information acquiring processor 23 acquires the publicized information from the corresponding server 60 according to the instruction (step 103). At this point, if the link depth is designated, publicized information stored in each of the storage locations present from the base site having the link depth of 1 which can be specified by the received URL to the designated link depth are acquired.

When the publicized information acquiring processor 23 acquires publicized information from the server 60, the publicized information acquiring processor 23 transmits an acquisition request (request) to the server 60, and the server 60 transmits publicized information in response to the acquisition request. When the server 60 transmits the publicized information, information such as date and time of acquisition of the publicized information, storage location information, and acquiring route are transmitted separately from the publicized information to the publicized information management server 20 as response information (response). The acquisition record information acquiring processor 24 acquires the response information as the acquisition record information according to an instruction by the information acquisition controller 32 (step 104). In the exemplary embodiment, the response information transmitted according to the communication protocol of the related art is effectively used, but the present invention is not limited to such a configuration, and the system may alternatively be configured such that a predetermined application is installed in the server 60 and necessary information is collected as the response information.

When the information managing unit 22 recognizes that the acquisition record information is acquired, the information managing unit 22 instructs the time stamp acquiring processor 25 to acquire a time stamp for validating the presence of the acquisition record information at the present time. According to the instruction, the time stamp acquiring processor 25 applies a predetermined acquiring process such as creating a digest from the acquisition record information and transmitting the digest to the TSA server 70, to acquire the time stamp (step 105). Then, the acquired time stamp is attached to the acquisition record information.

The "time stamp" refers to data recording date and time of creation of the file or correction of the file. "TSA" is an abbreviation for Time Stamp Authority, and is an organization for issuing a signature for validating that the issuing organization of the data of the time stamp is reliable.

When the publicized information replaying unit 33 in the information managing unit 22 recognizes that the publicized information is acquired, the publicized information replaying unit 33 creates display image data by replaying the publicized information (step 106). For example, when the publicized information is a text file described in HTML, the display image data is created using the browser function. When, on the other hand, the publicized information is a document file created by a particular document editing application, the document file is opened using the document editing application and the display image data is created. In this manner, display image data when the publicized information is displayed on the screen is acquired using an application of a version appropriate for displaying the publicized information when the publicized information is acquired. Then, the information managing unit 22 instructs the time stamp acquiring processor 25 to acquire a time stamp in order to validate the presence of the display image data at the current point. According to the instruction, the time stamp acquiring processor 25 applies a predetermined acquisition process such as, for example, creating a digest from the display image data and transmitting the digest to the TSA server 70, to acquire the time stamp (step 107). Then, the acquired time stamp is attached to the display image data.

When it is recognized that the publicized information and acquisition record information are acquired, the keyword extracting processor 34 in the information managing unit 22 extracts a characteristic keyword in the acquired publicized information as an important word for specifying the publicized information (step 108).

When the display image data and the time stamp, the keyword, and the acquisition record information and the time stamp are acquired for each publicized information in this manner, the information registering processor 35 correlates, to the publicized information, related information such as the document name of the publicized information and the site name of the storage location, attaches an identification number unique to the publication validation information, and registers in the publication validation information database 31 as the publication validation information of the publicized information (step 109).

The publicized information management server 20 specifies, as the publicized information to be validated, publicized information which can be specified by the URL and the link depth which are set in the above-described processes, and applies the above-described processes (steps 103-109) to each of the publicized information. Because the processes based on the publication record information (steps 104 and 105) and the processes based on the acquired publicized information (steps 106 and 107) can be executed simultaneously and in parallel to each other, the order of these processes is not limited to the order shown in the flowchart.

Although the above-described processes are executed when information for specifying publicized information is transmitted from the management client 40, the information acquisition controller 30 repeatedly executes the processes shown in steps 103-109 as a periodical process, for example, in a period of once per day, once per week, or once per month. By periodically collecting the publicized information in this manner, it is possible to validate that the publicized information is actually publicized at the time of collection.

The time stamp to be issued by the time stamp authority has an expiration date. Therefore, in the exemplary embodiment, the signature extending processor 26 is provided in order to allow extension of the expiration date of the time stamp as necessary. More specifically, the signature extending processor 26 periodically checks the expiration date of the time stamp attached to the display image data and acquisition record information, and extends the expiration date for information in which the expiration date is closing. When the presence of the publicized information is to be validated for a long period of time, it is desirable to store the time stamp in a long-term signature format such as CAdES and XAdES.

Figure 6:
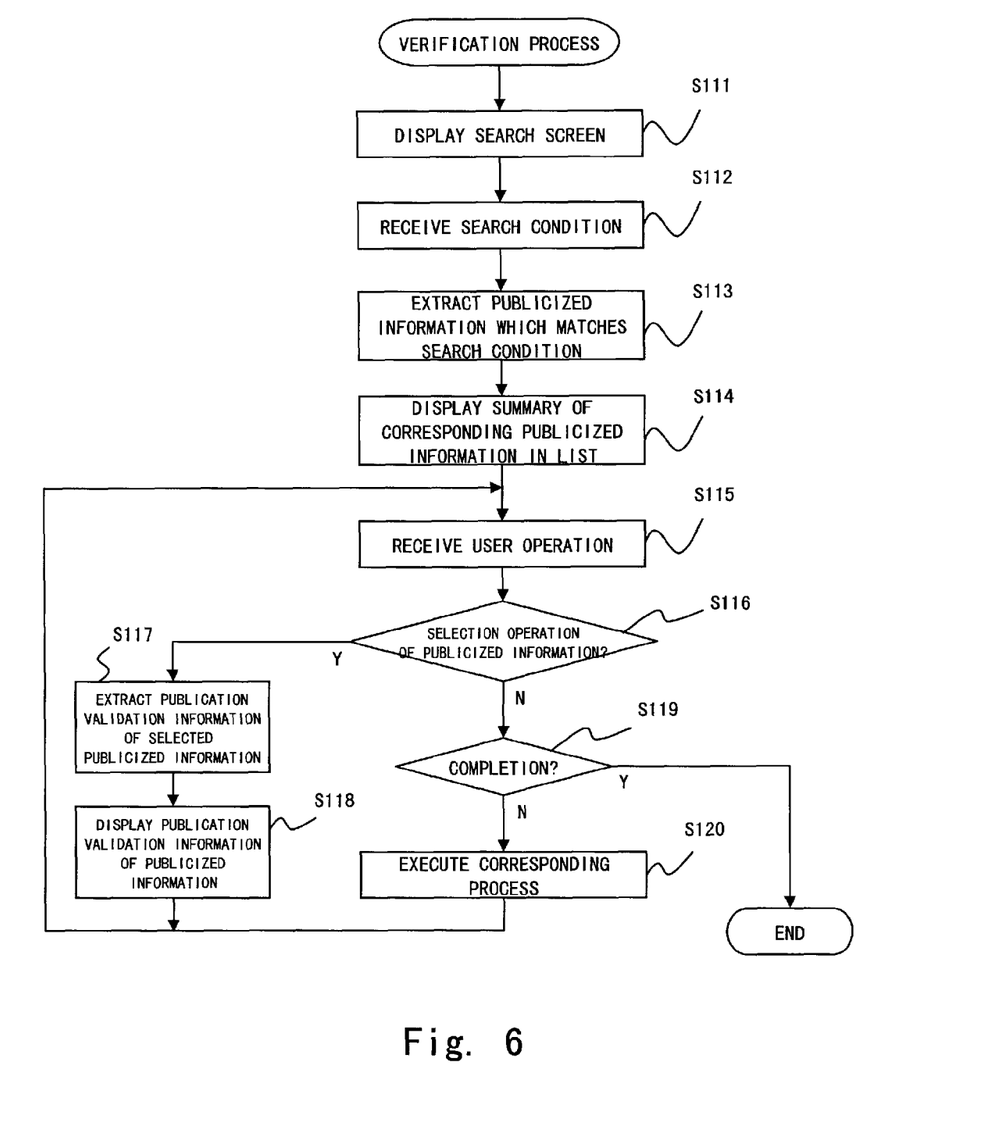
FIG. 6 is a flowchart showing a verification process of publicized information in an exemplary embodiment according to the present invention.

Next, an operation when the publicized information is verified by displaying the collected publication validation information will be explained referring to a flowchart shown in FIG. 6.

Figure 7:
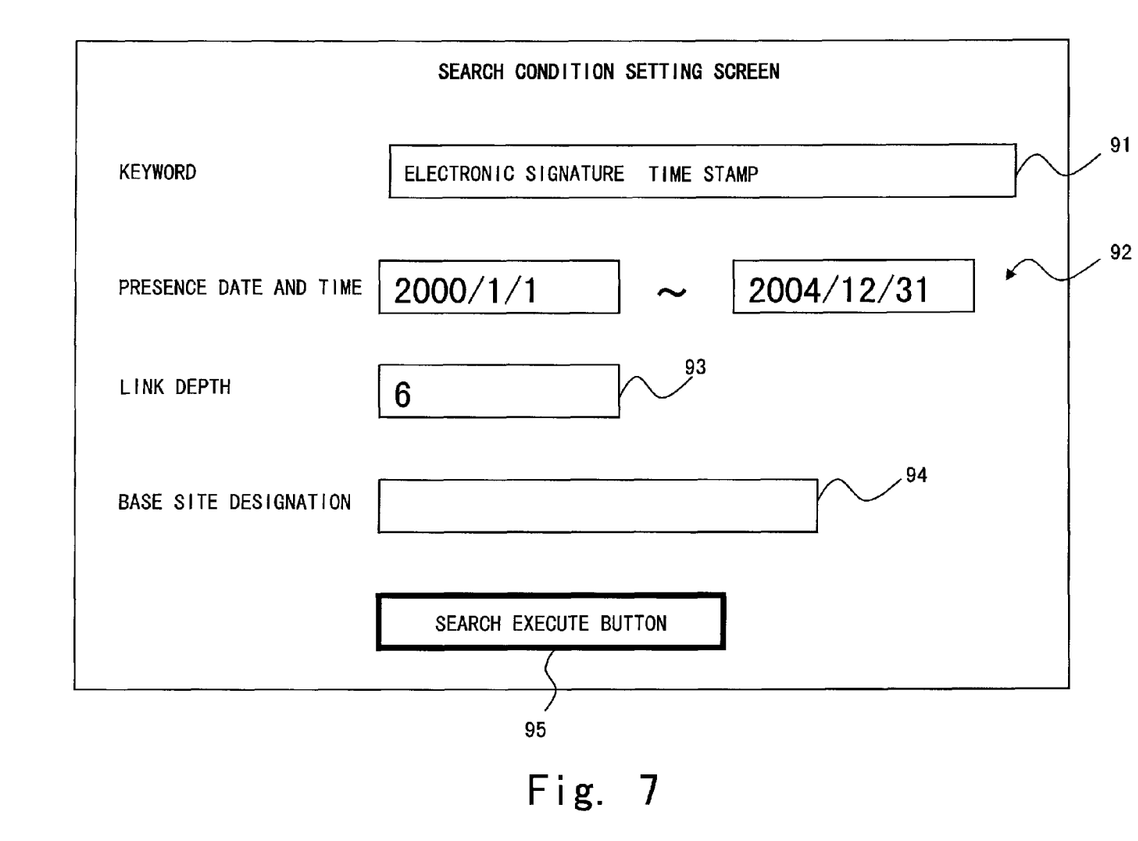
FIG. 7 is a diagram showing an example of a search condition setting screen in an exemplary embodiment according to the present invention.

First, at the verification client 50, in response to an input operation by a user, the search condition setting processor 51 displays a screen for setting a search condition on a display of the verification client 50 (step 111). FIG. 7 shows an example display of a setting screen displayed on the screen. The search condition setting processor 51 may be configured to display the setting screen by starting an application which is provided in the verification client 50 in advance, or may be configured to display the setting screen by extracting an HTML file from the publicized information management server 20 using the provided browser function. In the latter case, the verification client 50 does not need special software for realizing the exemplary embodiment. This also applies similarly to the case when the screen to be described later is to be displayed.

The setting screen of FIG. 7 includes a keyword input region 91, a presence time input region 92, a depth input region 93, and a base site input region 94, which are input regions for setting the search condition. One or multiple keywords for narrowing publicized information to be verified are set in the keyword input region 91. When multiple keywords are to be set, the user inserts a space between the keywords according to a fill-out rule. A starting time and an ending time of a period in which the publicized information to be verified is present are set in the presence time input region 92. A link depth from the base site for narrowing the storage location of the publicized information to be verified is set in the depth input region 93. A storage location of the publicized information to be verified is directly input in the base site input region 94.

When the user inputs and designates a search condition in at least one of the input regions 91-94 and clicks a "EXECUTE SEARCH" button 95, the search condition setting processor 51 transmits the input search condition to the publicized information management server 20.

When the search condition for specifying the publicized information to be verified transmitted from the verification client 50 is received by the request receiving processor 27 in the publicized information management server 20 (step 112), the searching processor 36 in the information acquiring processor 28 searches the publication validation information database 31 according to the received search condition to extract publicized information matching the search condition (step 113). In the exemplary embodiment, in general, the publicized information satisfying all of the set search conditions is extracted. Therefore, in the example setting of the search condition shown in FIG. 7, publicized information which includes, as keywords, "electronic signature" and "timestamp" which are set as keywords, is collected in a period from Jan. 1, 2000 to Dec. 31, 2004, and has an item value included in link depth from the base site of 1-6 set in the publication validation information are selected. The information acquiring processor 28 then extracts, from the publication validation information database 31, storage location information of the corresponding publication validation information (URL) and related information of the publicized information necessary for information display at the verification client 50. The display information transmitting processor 30 transmits the information extracted by the information acquiring processor 28 to the verification client 50.

Figure 8:
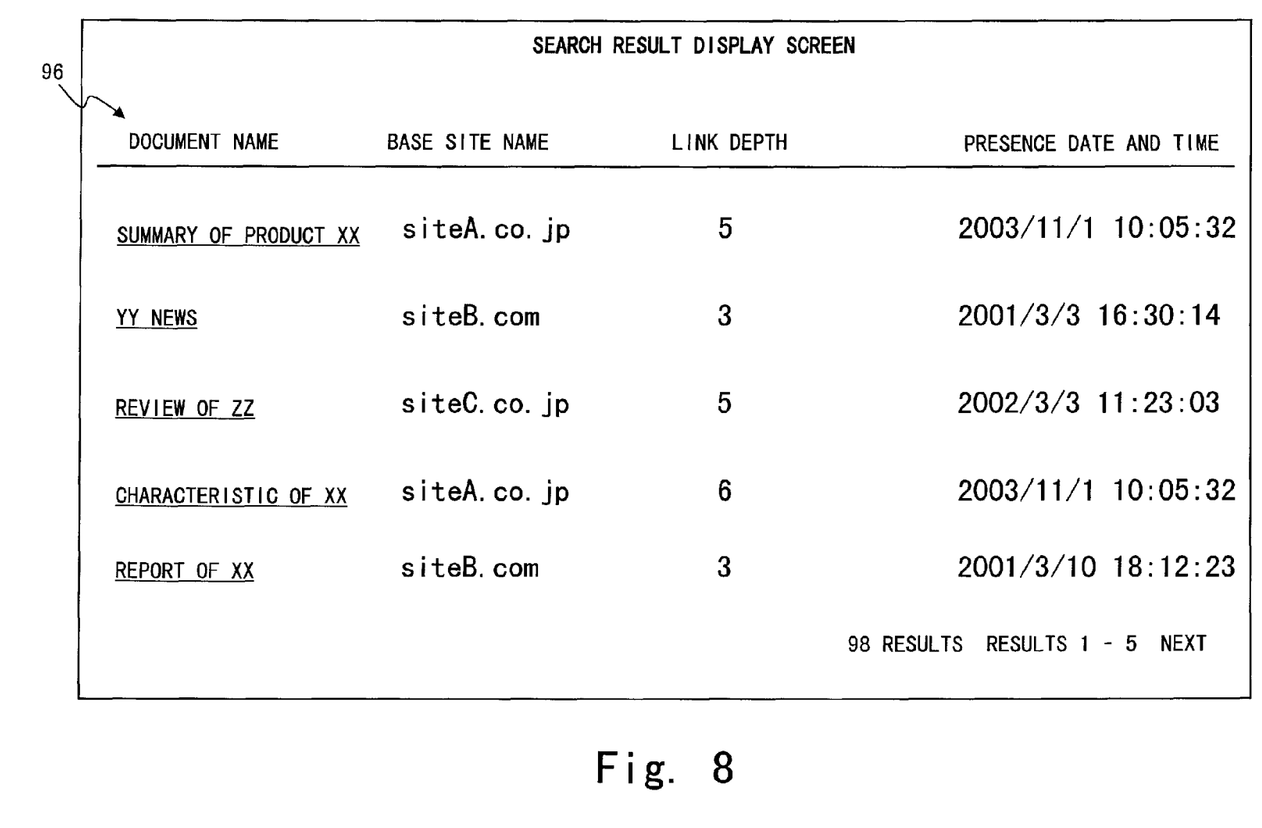
FIG. 8 is a diagram showing an example of a search result display screen in an exemplary embodiment according to the present invention.

The display processor 53 in the verification client 50 displays, in a list, summary of publicized information matching the search condition according to information transmitted from the publicized information management server 20 (step 114). FIG. 8 shows an example of a search result display screen in which the summary of the publicized information is displayed. In the example search result display screen shown in FIG. 8, a document name of the publicized information, a name of the base site, a link depth from the base site of the location in which the publicized information is stored, and a presence date and time, are displayed as the summary information indicating the publicized information. In this display screen, each document name displayed on a display column 96 for document name is displayed in a selectable manner.

When the verification client 50 receives an operation performed by the user (step 115) and the operation is a selection operation (clicking) of "summary of product XX" (Y in step 116), the publication validation information acquiring processor 52 transmits, to the publicized information management server 20, an acquisition request including the URL of the publication validation information correlated to the "summary of product XX".

When the request receiving processor 27 in the publicized information management server 20 receives the acquisition request transmitted from the verification client 50, the searching processor 36 in the information acquiring processor 28 extracts, from the publication validation information database 31, corresponding publication validation information from the URL designated by the acquisition request (step 117). The display information transmitting processor 30 transmits the publication validation information extracted by the information acquiring processor 28 to the verification client 50.

Figure 9:
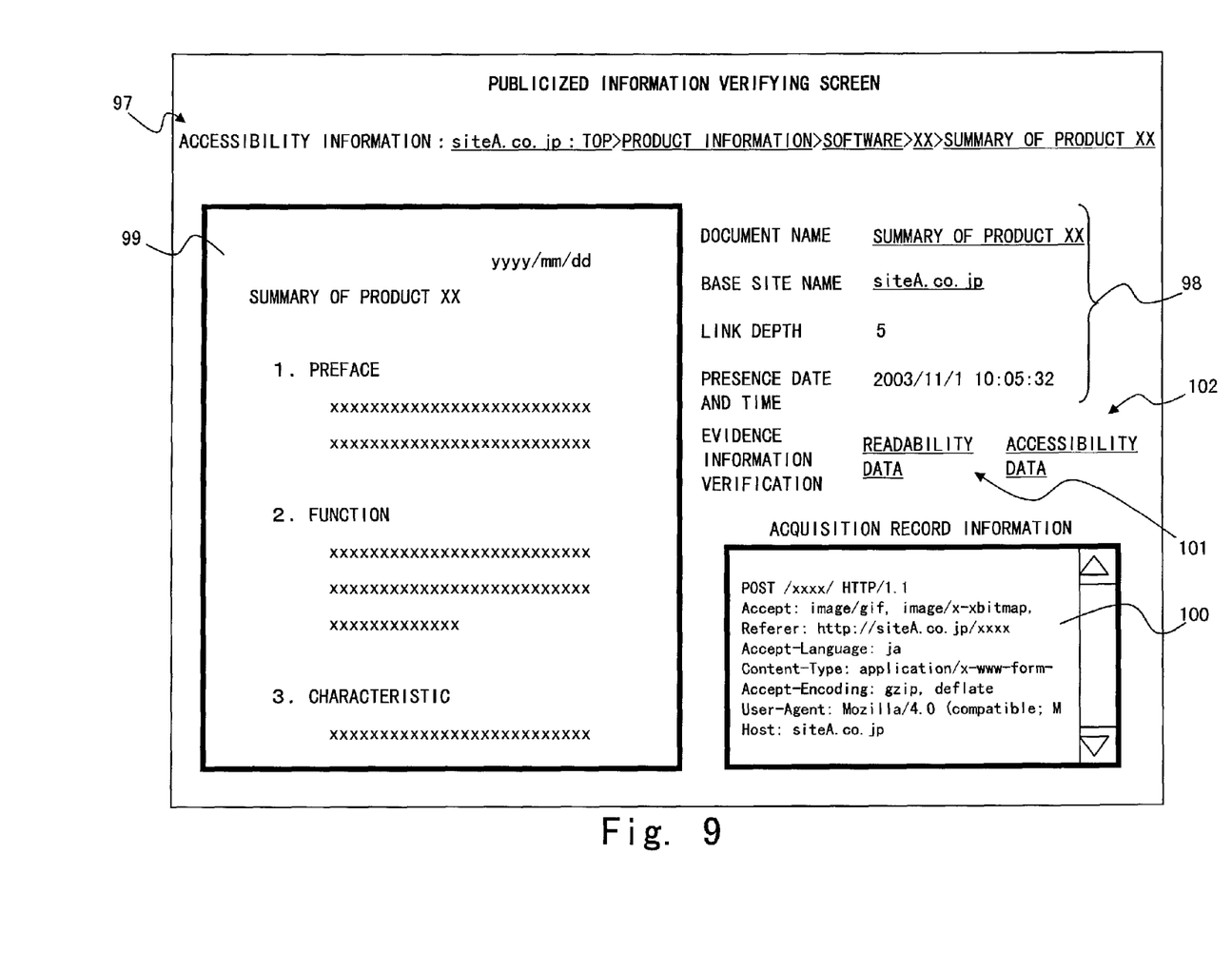
FIG. 9 is a diagram showing an example of a publicized information verification screen in an exemplary embodiment according to the present invention.

The display processor 53 in the verification client 50 acquires the publication validation information transmitted from the publicized information management server 20 and displays the publication validation information on screen (step 118). FIG. 9 shows an example screen display when the publication validation information is displayed. The verification screen of publication information shown in FIG. 9 has display regions 97, 98, 99, and 100 for accessibility information, publicized information related information, display image data, and acquisition record information. A link route from the base site to the publicized information "summary of product XX" is displayed in the accessibility information display region 97. Information related to the publicized information to be verified including information corresponding to the summary of the publicized information is displayed in the publicized information related information display region 98. Display image data of the publicized information is displayed in the display image data display region 99. The user checks whether or not the information is publicized in a state securing the readability by viewing the display content. The acquisition record information is displayed in the acquisition record information display region 100. Because the acquisition record information includes information related to the publicized information such as a type, a version, and a storage location of the publicized information and information for specifying an acquiring route when the publicized information management server 20 acquired the publicized information, the user checks the accessibility, that is, whether or not the publicized information is stored at a location which can be easily accessed (extracted), by viewing the display content of the acquisition record information.

In this manner, at the same time as allowing the verification of the presence of the corresponding publicized information, readability indicating whether or not the publicized information is actually publicized in a viewable state and accessibility indicating whether or not the publicized information is stored in a location which can be easily referred are specifically presented. In particular, because the display image data is created during the period when the publicized information is publicized, an application of a version when the publicized information has been publicized is not necessary for displaying the publicized information at the current point. Although the verification client 50 is configured such that the publication validation information is displayed on screen for verifying the publication of the publicized information, the output location of the information in the present invention is not limited to the display, and may be another output unit such as, for example, a printing device which prints and outputs the information on a paper medium or the like.

There may be cases in which it is desired to check whether or not the information displayed on the display regions 99 and 100 for display image data and acquisition record information are reliable information. In this case, the user clicks on the buttons 101 and 102 for readability data and accessibility data. When the readability data button 101 is clicked, the publication validation information acquiring processor 52 inquires to the publicized information management server 20 for the validity of the display image data.

In response to this inquiry, the verifying processor 29 in the publicized information management server 20 verifies the validity of the presence validation information of the display image data, and returns the verification result to the verification client 50. The verifying processor 29 inquires to the TSA server 70 as necessary. The determination as to whether or not to inquire to the TSA server 70 depends on the type of the presence validation information acquired from the TSA and the level of strictness of the verification process.

The display processor 53 of the verification client 50 displays on screen the result of the validity determination, that is, whether or not the display image data is valid.

The process when the accessibility data button 102 is clicked by the user is similar to the process when the readability data button 101 is clicked, and thus will not be described again. In this manner, the user can check the reliability of the display image data or the acquisition record information which is displayed.

Referring back to FIG. 6, when the user's operation when the search result screen of FIG. 8 is displayed is neither a selection operation of the publicized information (N in step 116) nor a display completion operation (N in step 119), and is another operation such as, for example, clicking on a "NEXT" button, in order to refer to publicized information which is not displayed on the current display screen, a process according to the operation instruction is executed (step 120). When a display completion operation is performed (Y in step 119), the verification process of the publicized information is completed.

In the exemplary embodiment, the processes are distributed such as the collective management of the information required for the verification being executed by the publicized information management server 20, the necessary setting of information being executed by the management client 40, and verification of the publicized information being executed by the verification client 50, but the present invention is not limited to such a configuration, and it is also possible to alternatively employ a configuration, for example, in which the publicized information management server 20 executes various functions of the setting of the information and verification of the publicized information. In addition, in the exemplary embodiment, the publication validation information database 31 is configured to store and manage the information, but the present invention is not limited to such a system configuration, and it is also possible to alternatively employ a configuration, for example, in which the publicized information management server 20 is stored in the database server. The system configuration can be determined according to the capability of the computers and the system environment.

The management client 40 or the verification client 50 is not limited to a personal computer, and may alternatively be incorporated in, for example, a portable phone, a game machine, a car navigation device, a home information appliance, a copier, a facsimile device, a scanner, a printer, and a multifunction device (which is also called a multifunction copier and has functions of one or more of a scanner, a printer, a copier, a facsimile device, etc.).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. An information processor comprising:
   a receiving unit that receives information which specifies a storage location of publicized electronic information to be validated;

a publicized information acquiring unit that acquires the publicized electronic information from the storage location, which is specified by the storage location specifying information received by the receiving unit; and an information registering unit that registers publication validation information of the acquired publicized electronic information in a memory, the publication validation information includes image data of the acquired publicized electronic information and acquisition record information which indicates a path by which the publicized electronic information is acquired.

2. An information processor comprising:

a designated condition receiving unit that receives a search condition of publicized electronic information designated by a user;

a transmitting unit that transmits the search condition received by the designated condition receiving unit to another information processor; and an outputting unit that outputs publication validation information transmitted from the another information processor in response to a transmission request, the publication validation information includes image data of the publicized electronic information and acquisition record information which indicates a path by which the publicized electronic information is acquired.

3. A computer readable medium storing a program causing a computer to execute a process, the process comprising:

receiving information which specifies a storage location of publicized electronic information, for which publication is to be validated;

acquiring the publicized electronic information from the storage location which is specified by the storage location specifying information; and registering publication validation information of the acquired publicized electronic information, the publication validation information includes image data of the acquired publicized electronic information and acquisition record information which indicates a path by which the publicized electronic information is acquired.

4. The computer readable medium according to claim 3, wherein the process further comprises:

acquiring presence validation information of the image data of the publicized electronic information; and registering the presence validation information by including the presence validation information in the publication validation information of the publicized electronic information.

5. The computer readable medium according to claim 3, wherein the process further comprises:

acquiring presence validation information of the acquisition record information; and registering the presence validation information by including the presence validation information in the publication validation information of the publicized electronic information.

6. The computer readable medium according to claim 3, wherein the process further comprises:

acquiring a time stamp and a digital signature attached by a public time stamp authority.

7. The computer readable medium according to claim 3, wherein the process further comprises:

acquiring, when information indicating a depth of hierarchy of which the publicized electronic information is to be acquired is further received, publicized information stored in storage locations which is between the storage location which is specified by the received storage location specifying information and the storage location at the depth of the hierarchy.

8. The computer readable medium according to claim 3, wherein the process further comprises:

extracting an important term representing a characteristic of the publicized electronic information; and registering the important term by including the important term in the publication validation information of the publicized electronic information.

9. A computer readable medium storing a program causing a computer to execute a process, the process comprising:

receiving a search condition;

searching a storage, which stores publication validation information for validating that publicized electronic information has been publicized, according to the search condition, to specify publicized electronic information which matches the search condition; and reading the publication validation information of the specified publicized electronic information from the storage and outputting the publication validation information;

wherein the publication validation information includes image data of the publicized electronic information and acquisition record information which indicates a route by which the publicized electronic information is acquired.

10. A computer readable medium storing a program causing a computer that verifies that publicized electronic information has been publicized by inquiring to another computer, to execute a process, the process comprising:

receiving a search condition of publicized electronic information designated by a user;

transmitting the search condition to the another computer; and outputting publication validation information transmitted from the another computer in response to a transmission request, the publication validation information includes image data of the publicized electronic information and acquisition record information which indicates a path by which the publicized electronic information is acquired by the another computer.

11. The computer readable medium according to claim 10, wherein:

the publication validation information includes presence validation information of image data of the publicized electronic information.

12. The computer readable medium according to claim 10, wherein:

the publication validation information includes presence validation information of acquisition record information which indicates at least an acquiring path by which the publicized electronic information is acquired.

13. An information processing method comprising:

receiving information which specifies a storage location of publicized electronic information to be validated;

acquiring the publicized electronic information from the storage location which is specified by the storage location specifying information; and registering, in a storage, publication validation information of the acquired publicized information, the publication validation information includes image data of the acquired publicized electronic information and acquisition record information which indicates a path by which the publicized electronic information is acquired.

14. The method according to claim 13, further comprising:
acquiring acquisition record information which includes at least an acquiring path by which the publicized electronic information is acquired; and
registering the acquisition record information in the storage by including the acquisition record information in the publication validation information of the publicized electronic information.

15. The method according to claim 13, further comprising:
acquiring presence validation information of the image data of the publicized electronic information; and
registering the presence validation information in the storage by including the presence validation information in the publication validation information of the publicized electronic information.

16. An information processing system comprising:
an information specifying unit that specifies storage location of electronic information of which publication of the electronic information is to be validated;
a publicized information acquiring unit that acquires the electronic information, for which publication is to be validated, from the specified storage location;
an information registering unit that registers, in a memory, publication validation information of the acquired electronic information, the publication validation information includes image data of the acquired electronic information and acquisition record information which indicates a path by which the acquired electronic information is acquired;
a searching unit that designates a search condition to search electronic information of which publication is to be verified;
an information specifying unit that searches the memory, according to the designated search condition, to specify electronic information which matches the search condition;
an information transmitting unit that reads, from the memory, publication validation information of the specified electronic information and transmits the publication validation information; and
a verification unit that verifies the transmitted publication validation information.

* * * * *